United States Patent Office 3,498,901
Patented Mar. 3, 1970

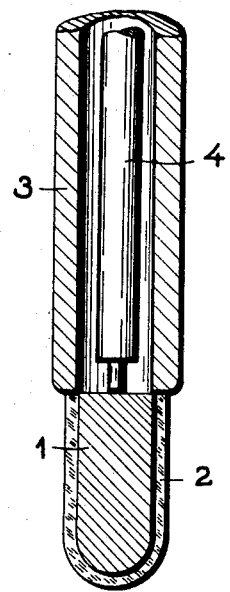

3,498,901
GLASS ELECTRODE
Leendert Theodor Metz, Herkenbosch, and Jan Van Houwelingen and Hendrik De Jong, Hoevelaken, Netherlands, assignors to Maatschappij voor Electronische Bedrijfsautomatisering Electrofact N.V., Radiumweg, Amersfoort, Netherlands
Continuation-in-part of application Ser. No. 374,032, June 10, 1964. This application July 5, 1968, Ser. No. 747,418
Int. Cl. G01n 27/36
U.S. Cl. 204—195                    2 Claims

ABSTRACT OF THE DISCLOSURE

A glass electrode for pH measurements comprising a copper connection electrode carrying a layer of copper oxide, the thickness of said layer being in excess of that which would occur due to exposure to the atmosphere of the connection electrode, and preferably in the order of $20\mu$, and a layer of glass superimposed on said oxide layer.

---

The present application is a continuation-in-part of the co-pending application Ser. No. 374,032, filed June 10, 1964, now abandoned.

The invention relates to a glass electrode for pH measurements.

The known glass electrodes for the greater part comprise a very thin-walled sphere of a special glass composition, a buffer solution being arranged therein, in which the metal connection electrode is immersed. These electrodes have the disadvantage, that they are rather fragile, are not able to withstand very high ambient pressures and are liable to burst at high temperatures, due to the pressure of the buffer liquid.

It has already been proposed to provide a metal connection electrode directly with a thin layer of glass, but with this type of electrode a potential difference between the glass and the metal occurs, which over long periods is inconstant and which, moreover, is temperature-dependent.

Further the adhesion of the glass to the metal is not sufficiently strong, so that temperature changes can cause cracks or even chipping of the glass, due to the different thermal expansion coefficients of the glass and the metal.

It has also been proposed to provide the glass on a piece of a porous ceramic material, to impregnate this with the buffer solution and to provide it with a connection electrode, but this has not resulted in a practically satisfactory electrode either.

It is an object of the invention to provide a glass electrode which is very sturdy and in which the potential difference between the glass and the metal connection electrode is constant over long periods and is virtually independent of the temperature.

For that purpose, an electrode according to the invention consists of a copper connection electrode which has been superficially oxidized. The thickness of the oxide layer has to exceed the thickness of an oxide layer which would form by exposure of the copper to the atmosphere; it should be at least $20\mu$ and preferably higher.

It appears that the oxide film on applying the molten glass partly diffuses into the glass, whereby an intimate contact between the glass and the connection electrode is obtained. This insures long-term constancy of the potential difference and also virtual independence of this potential difference from the temperature.

Further it appears that due to the diffusion of the oxide, the glass layer immediately adjacent the connection electrode obtains a thermal expansion coefficient which is between the thermal expansion coefficients of the metal and of the glass at greater distance from the connection electrode, into which no oxide has diffused. Thereby a good adhesion is ensured even after temperature changes and at high temperatures.

For best results, the glass to be used should have high alkali metal content; compounds of the metals lithium and sodium are preferred because of the small size of the atoms. A high oxygen content is further desirable, and oxides, such as $La_2O_3$, may be added in addition to the lithium or sodium oxide, respectively.

The invention will be further explained below with reference to the drawing, which shows a longitudinal cross-section through an electrode according to the invention.

In the figure, the copper connection electrode 1 is superficially oxidized and a thin layer 2 of glass has been fused onto the oxidized surface. This unit can be cemented or fused to an insulating tube 3, through which the connection cable 4 extends.

As mentioned before, suitable glass compositions should have a high alkali content as well as a high oxygen content. The glass compositions should also exhibit an unusually low electrical resistivity and this is one of the reasons for the high alkali content. Upon submersion in water, there should be a spontaneous formation of a gel coating consisting of $SiO_2$.

The potential which is formed at the surface if the glass comes into contact with a liquid should follow Nernst's Law as closely as possible. The law here considered is expressed by the following equation:

$$V_{met} - V_{sol} = E_o + \frac{0.0577 + 0.0002(t-18)}{n} \log c$$

in which $V_{met}$ is the potential of the metal; $V_{sol}$ is the potential of the solution; $E_o$ is the normal potential occuring if the ion activity of the metal in the solution equals one; $t$ is the temperature in centigrades; $n$ is the ion valence and $c$ is ion concentration.

Finally, the potential of the electrode should only be dependent on hydrogen ion concentration, and not affected by other ions present.

By way of example, the following glass compositions are mentioned as suitable:

|        | Mol percent |    |    |
|--------|----|----|----|
| $SiO_2$ | 68 | 64 | 63 |
| $Li_2O$ | 28 | 25 | 27 |
| $CaO$   | 4  | 3  | 2  |
| $Cs_2O$ |    | 2  | 3  |
| $La_2O_3$ |  | 3  |    |
| $BaO$   |    | 3  | 5  |

A glass of the above composition will have a thermal expansion coefficient around $100 \times 10^{-7}$ per degree centigrade.

The improvement of the adhesion between glass and metal by a special oxide layer is known per se, but the application of this technique to glass electrodes is novel. It is the only way for meeting the major requirements for these electrodes, such as:

(a) obtaining a reproducible potential difference between glass and metal (b) obtaining that this potential difference remains constant with the time (c) obtaining a maximum independence of the temperature of the potential difference (d) obtaining that the potential difference always returns to the same initial value, even after repeated heating to at least 100° C.

(e) obtaining the lowest possible transition resistance between glass and metal (f) suppressing polarization effects during the passage of current as much as possible.

Those skilled in the art will understand that various modifications and substitutions may be made in the present device without departing from the spirit of this invention or the scope of the appended claims.

What is claimed is:

1. A glass electrode for pH measurements comprising a copper connection electrode carrying a conductive layer of copper oxide, the thickness of said conductive layer being in excess of that which would occur due to exposure to the atmosphere of the copper connection electrode, and at least $20\mu$ thick, and a layer of pH sensitive glass superimposed on said oxide layer, said copper oxide being diffused into the glass to form a layer having a thermal expansion coefficient intermediate the corresponding coefficients of the copper electrode and the glass at a greater distance from said electrode beyond the range of oxide diffusion.

2. A glass electrode according to claim 1 wherein the glass has a composition which includes $Li_2O$.

References Cited

UNITED STATES PATENTS 2,422,628    6/1947    McCarthy _____ 117—53

FOREIGN PATENTS 492,936    9/1938    Great Britain.

OTHER REFERENCES

Thompson, Nat. Bur. of Standards Jour. of Research, vol. 9 (1932) pp. 833–839.

Ives et al., Reference Electrodes, 1961, 327–333.

T. TUNG, Primary Examiner

U.S. Cl. X.R.

117—53.70